(12) United States Patent
Kasai et al.

(10) Patent No.: US 6,367,260 B1
(45) Date of Patent: Apr. 9, 2002

(54) ENGINE WASTE HEAT RECOVERING APPARATUS

(75) Inventors: Akihito Kasai; Yoshinori Nakagawa, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/695,709

(22) Filed: Oct. 25, 2000

(30) Foreign Application Priority Data

Nov. 4, 1999 (JP) .......................................... 11-313554

(51) Int. Cl.$^7$ .............................................. F01K 17/00
(52) U.S. Cl. ..................... 60/648; 60/39.183; 60/597; 123/136; 55/59; 237/2 B
(58) Field of Search ............................ 60/648, 39.183, 60/597; 55/59; 123/13 H; 122/3, 7 R, 7 B, 20 B; 62/238.6; 237/2 B

(56) References Cited

U.S. PATENT DOCUMENTS

| | | | |
|---|---|---|---|
| 4,214,450 A | * | 7/1980 | Nagashima et al. .......... 60/648 |
| 4,327,670 A | * | 5/1982 | Teller ........................ 122/20 B |
| 4,589,890 A | * | 5/1986 | Gronvaldt ....................... 55/59 |
| 4,697,434 A | * | 10/1987 | Yuyama ....................... 237/2 B |

FOREIGN PATENT DOCUMENTS

| | | | | |
|---|---|---|---|---|
| JP | 355051296 A | * | 4/1980 | |
| JP | 403122465 A | * | 5/1991 | ................ 62/238.3 |
| JP | 11-72018 | | 3/1999 | |
| JP | 411294895 A | * | 10/1999 | |

* cited by examiner

Primary Examiner—Thomas Denion
Assistant Examiner—Thai-Ba Trieu
(74) Attorney, Agent, or Firm—Armstrong, Westerman & Hattori, LLP

(57) ABSTRACT

A means for eliminating a frozen or near frozen state in a drain of the condensed water generated by the action of an exhaust gas heat exchanger is provided. The condensed water separated from the exhaust gas in a silencer (31) is passed through a waste water trap provided with the joint (34) and discharged to the outside. The joint (34) also has a passage provided therein for circulating a heat transfer medium through an externally (separately) installed heat exchanger (52A). When the engine (2) is started, it is judged, based on the temperature of the waste water trap or the water measured by a sensor (53), whether the frozen state is present or not. When it is judged that the frozen state is present, a water pump 10 is switched on for circulating the heat transfer medium through the waste water trap.

7 Claims, 7 Drawing Sheets

ENGINE WASTE HEAT RECOVERING APPARATUS

BACKGROUND OF THE INVENTION

1. Field of the Invention

The present invention relates to an engine waste heat recovering apparatus, and particularly to an apparatus recovering waste heat generated from an engine used as a power source in a cogeneration system.

2. Description of the Related Art

As environmental protection has been a global major issue, cogeneration systems having a gas engine as a power source fueled with city gases for both the generation of electric power and the supply of hot water are now focused to efficiently recover heat generated by the operation of the engine. One type of such cogeneration system is provided with an exhaust gas heat exchanger for recovering heat from the exhaust gas of the engine.

The exhaust gas heat exchanger includes a means for discharging condensed water generated during the cooling down of the exhaust gas. For example, a scheme disclosed in Japanese Patent Laid-open Publication (Heisei) 11-72018 permits the condensed water to be discharged from a drain passage with a waste water trap mounted in the bottom of a muffler.

That type of the cogeneration system enables the recovery of heat at high efficiency and can thus be used particularly in cold districts. In a cold district, the condensed water may be frozen in the waste water trap during the cold season or in early morning or late night in winter. For avoiding such freezing of the condensed water, the drain passage is commonly heated by an electric heater. However, if there is little room for installation of the electric heater, a limited size of the electric heater can only be used. Also, the use of an electric heater may increase the consumption of electric power.

SUMMARY OF THE INVENTION

The present invention has been developed in view of the above aspects and its object is to provide an engine waste heat recovering apparatus capable of inhibiting the freezing of condensed water without using an extra component such as an electric heater requiring a considerable size of room and without increasing the consumption of power.

As a first feature of the present invention, an engine waste heat recovering apparatus having an exhaust gas heat exchanger for recovering heat from the exhaust gas of an engine and a drain passage for discharging the condensed water generated by heat exchange in the exhaust gas heat exchanger, comprising, a joint for communicating an internal heat transfer medium path with an external heat exchanger externally installed from the waste heat recovering apparatus, a water pump for circulating the heat transfer medium in the heat transfer medium path, a waste water trap provided across the drain passage, the waste water trap being extended across the joint to the outside; and a defrosting means for switching the water pump on when condensed water is frozen in the waste water trap.

As a second feature of the present invention, the engine waste heat recovering apparatus, further comprising a silencer for separating the condensed water from the exhaust gas released from the exhaust gas heat exchanger, wherein the joint has a passage provided therein for receiving the exhaust gas from the exhaust gas heat exchanger and transferring it to the silencer and the condensed water separated in the silencer is conveyed to the waste water trap.

As a third feature of the present invention, the engine waste heat recovering apparatus, further comprising, a sensor for detecting the temperature of at least one of the waste water trap and waste water, and a freeze detecting means for comparing the temperature detected by the sensor with a reference temperature representing the frozen state of the waste water in the waste water trap, wherein, when it is judged that the waste water trap is in a frozen state on the basis of a result of the comparison, the water pump is switched on.

As a fourth feature of the present invention the sensor is mounted to the joint.

According to the first to fourth features of the present invention, when the condensed water is in a frozen or near frozen state (phase) in the waste water trap, the water pump is switched on for circulating the heat transfer medium. As the heat transfer medium is circulated through a heat exchanger externally or separately installed from the waste heat recovering apparatus, its temperature is as high as a degree of the temperature of the heat exchanger or, more particularly, the temperature of hot water in the hot water storage tank in which the heat exchanger is equipped. As the waste water trap is provided in a joint communicated with the circulating path of the heat transfer medium, the frozen or near frozen state of its condensed water can be eliminated by thermal energy of the heat transfer medium.

DETAILED DESCRIPTION OF THE PREFERRED EMBODIMENTS

Figure 1:
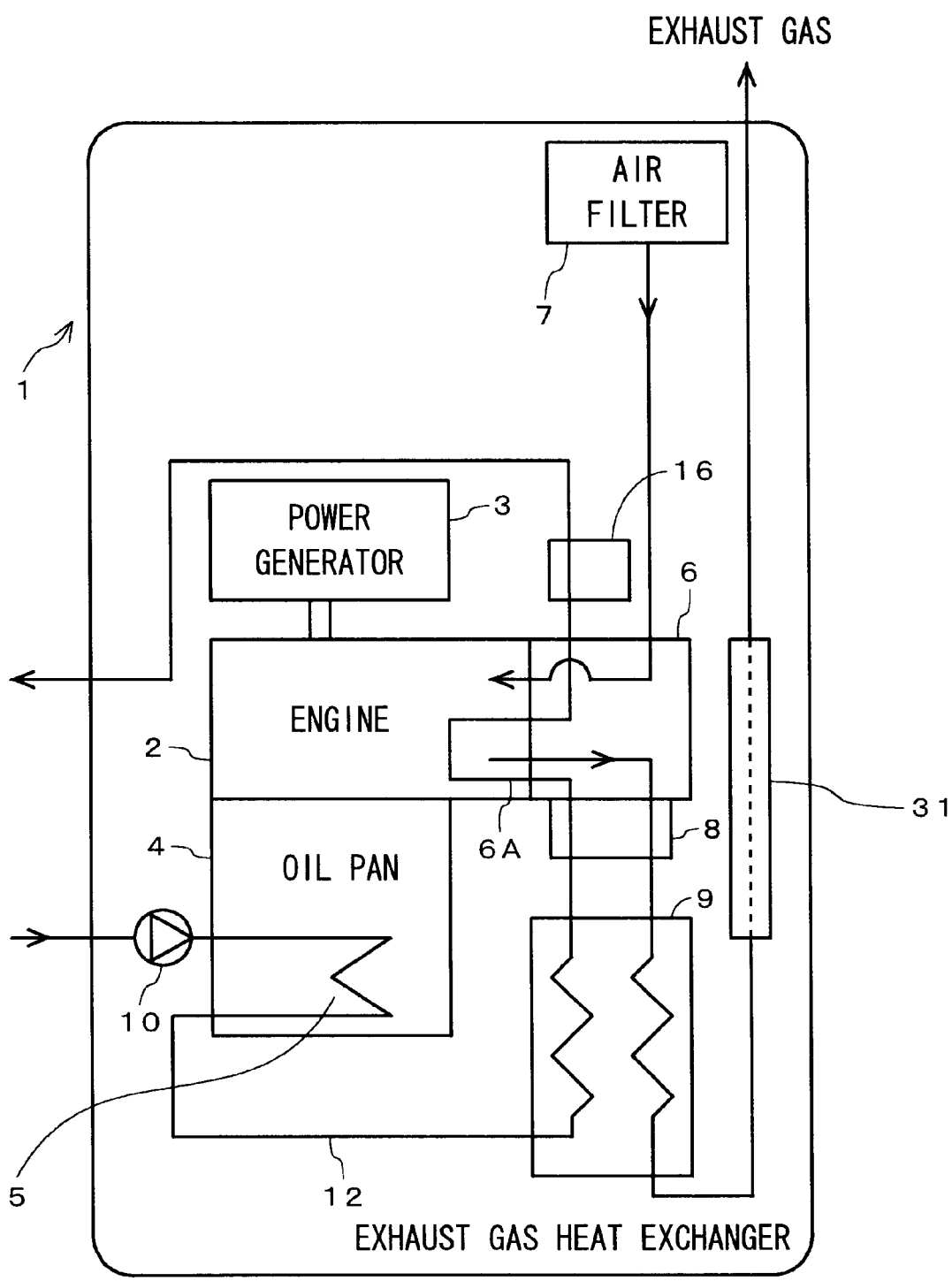
FIG. 1 is a block diagram showing a primary part of an engine waste heat recovering apparatus according to an embodiment of the present invention.

An embodiment of the present invention will be described in more detail referring to the relevant drawings. FIG. 1 is a block diagram showing an arrangement of an engine waste heat recovering apparatus in a cogeneration system. The engine waste heat recovering apparatus 1 is designed for recovering heat from the engine of a power generator. The waste heat recovering apparatus 1 is linked to the engine 2 and the power generator 3 mechanically connected to the engine 2. The power generator 3 generates an alternating current corresponding to the number of revolutions of the engine 2. The engine 2 has an oil pan 4 for storage of lubrication oil. The oil pan 4 includes an oil cooler (an oil heat exchanger) 5 which carries out heat exchange between the oil in the oil pan 4 and the heat transfer medium (a cooling water). A cylinder head 6 of the engine 2 takes air in from an air filter 7. The exhaust gas from the engine 2 is passed through an exhaust gas manifold 8 and an exhaust gas heat exchanger 9 and discharged out from a silencer 31.

For recovering heat generated by the engine 2 at high efficiency, a circulating path 12 for the heat transfer medium is provided. A water pump 10 is mounted at the inlet of the circulating path 12 for circulating the heat transfer medium. This permits the water pump 10 not to meet a high temperature of the heat transfer medium, hence avoiding abrupt degradation of the sealant, or the like, and increasing the operational life of the water pump 10. The heat transfer medium pumped by the water pump 10 is conveyed through the oil heat exchanger 5 in the oil pan 4, the exhaust gas heat exchanger 9, the engine 2, the cylinder head 6, and a thermo-cover 16 and passed to a thermal load which will be described later. The thermo-cover 16 has a thermostat built therein for closing a valve when the temperature is below a predetermined degree to prevent the heat transfer medium from cooling down the engine cylinder.

As the heat transfer medium is circulated in the circulating path 12, it transfers heat generated by the engine 2 to the thermal load. More specifically, the heat transfer medium is conveyed to the oil heat exchanger 5 in the oil pan 4 where it cools down the oil or draws heat from the oil of the engine 2. The heat transfer medium receiving thermal energy at the oil heat exchanger 5 and the exhaust gas heat exchanger 9 and having a higher temperature is further passed through the conduits in the cylinder wall and the cylinder head 6 or the cooling unit of the engine 2 in the form of a water jacket 6A and its temperature rises up.

Figure 2:
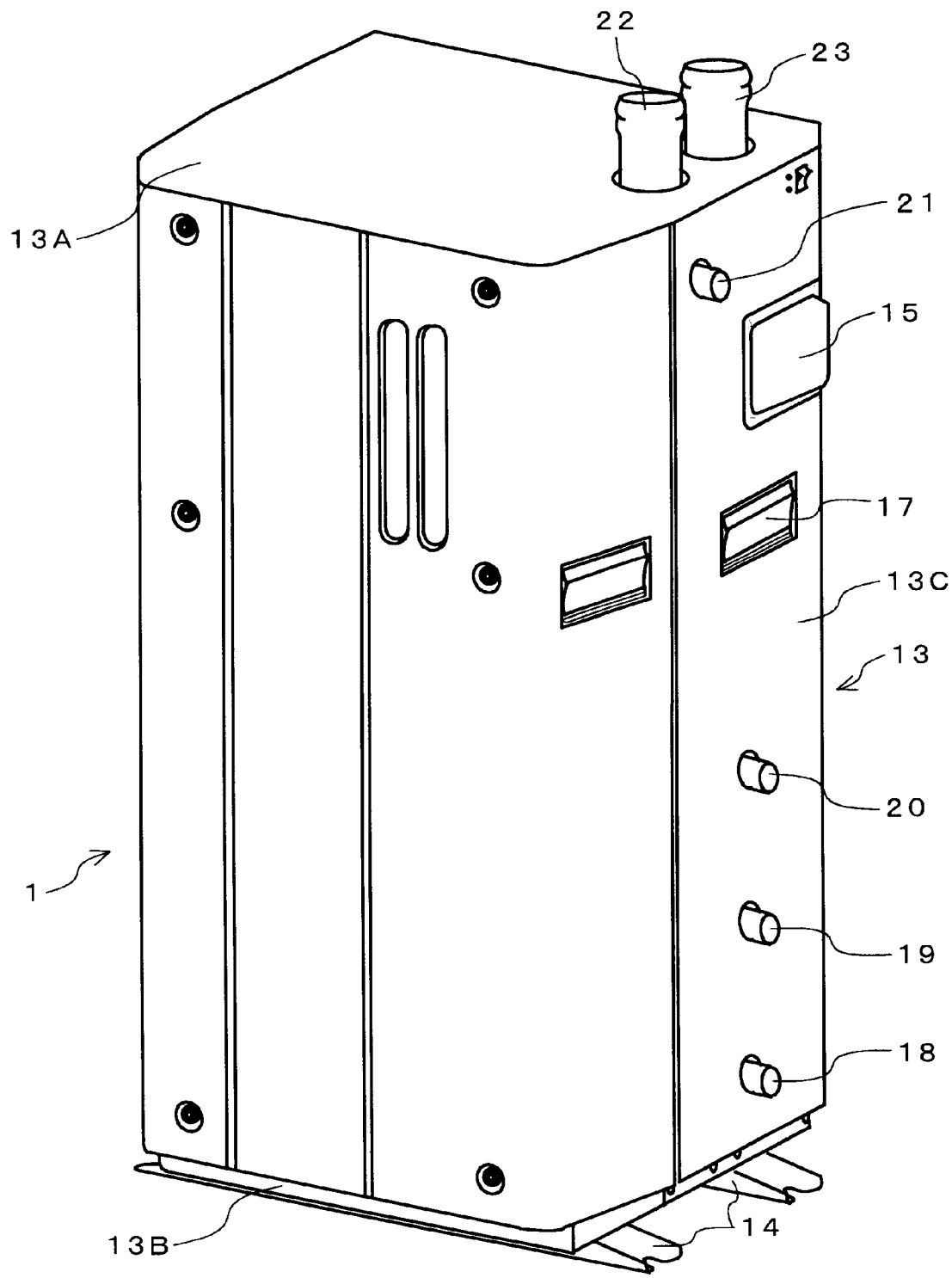
FIG. 2 is an external perspective view of the engine waste heat recovering apparatus.
Figure 3:
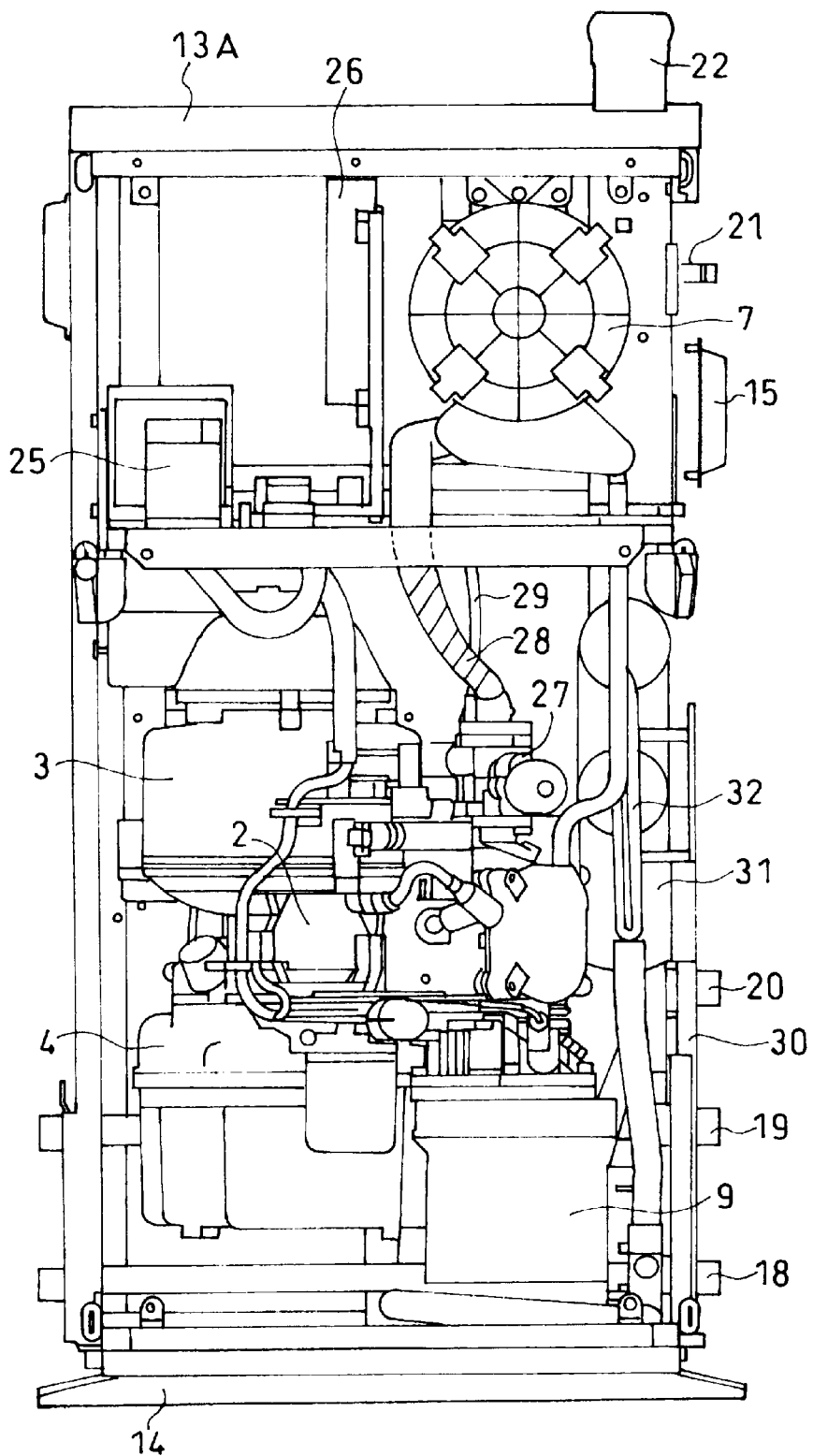
FIG. 3 is a front view of the engine waste heat recovering apparatus with its cover removed.
Figure 4:
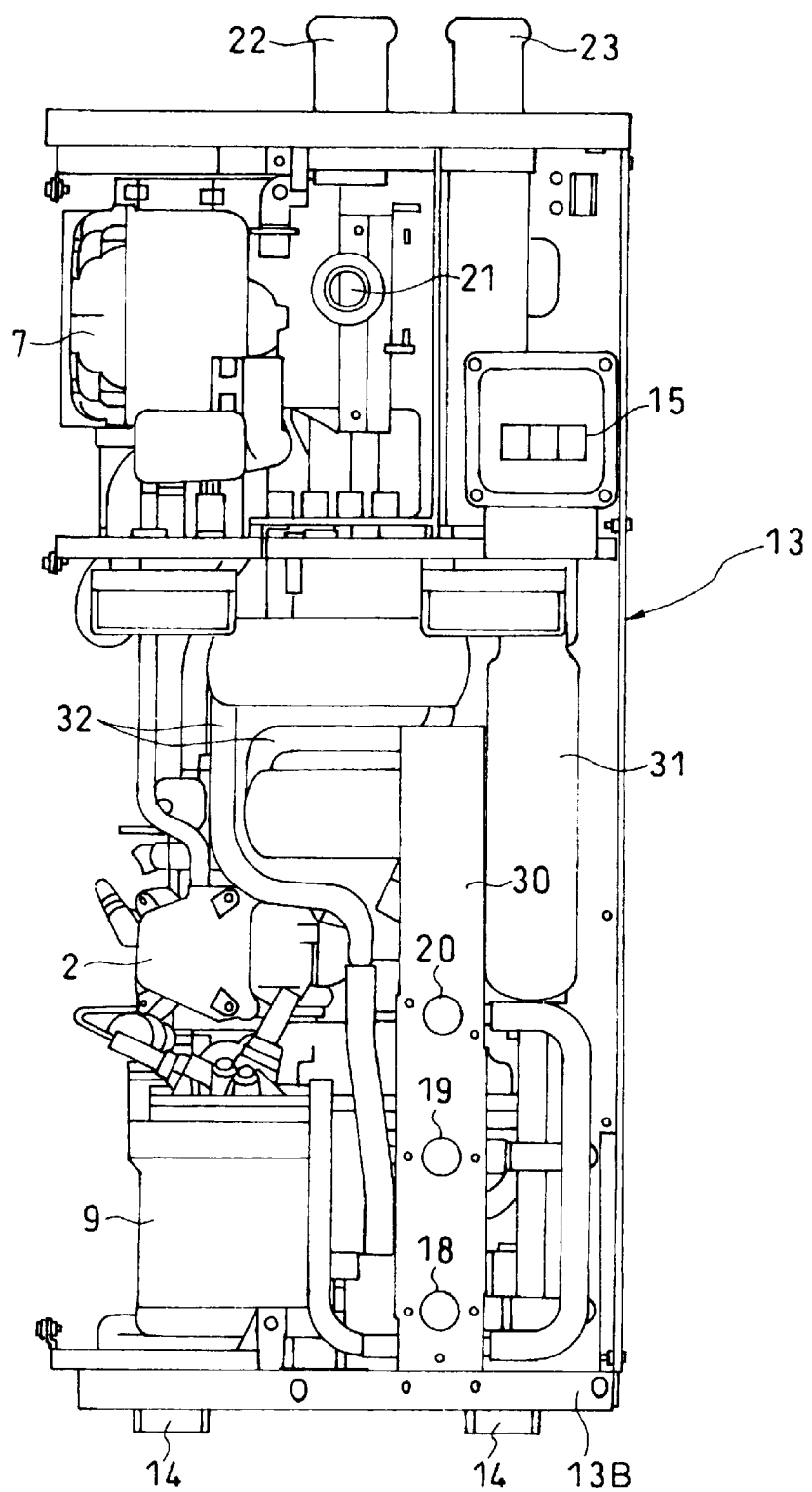
FIG. 4 is a side view of the engine waste heat recovering apparatus with its cover removed.

FIG. 2 is a perspective view showing the outside of the waste heat recovering apparatus. FIG. 3 is a front view of the waste heat recovering apparatus with its cover partially removed and FIG. 4 is a side view of the same seen from the right. Referring to FIG. 2, the waste heat recovering apparatus 1 is enclosed in a case 13 which comprises a top panel 13A, a bottom panel 13B, and a side panel 13C. The bottom panel 13B has legs 14 while the side panel 13C has an electric power terminal 15 and a grip 17. The side panel 13C also has through holes provided therein for accepting a heat transfer medium inlet pipe 18, a heat transfer medium outlet pipe 19, a condensed water drain pipe 20, and a fuel gas inlet pipe 21. The top panel 13A has holes provided therein for accepting an air intake tube 22 and an exhaust tube 23.

As shown in FIGS. 3 and 4, the air filter 7, a battery 25, and an ECU 26 are located at an upper region, the exhaust gas heat exchanger 9 at a lower region, and the engine 2 at an intermediate region of the waste heat recovering apparatus 1, respectively. The engine 2 is of a vertical type where its crank shaft (not shown) is vertically elongated and connected to the power generator 3. The oil pan 4 is located beneath the engine 2. A mixer 27 is mounted above the cylinder head of the engine 2 and connected to an air intake hose 28 extending from the air filter 27 and a gas pipe 29 extending from a fuel gas inlet pipe 21.

A right side stay 30 is mounted upright on the bottom panel 13B to extend along the side panel 13C. The stay 30 has joints 34, 44 and 38 (described later in more detail) which are provided with the heat transfer medium inlet pipe 18, the heat transfer medium outlet pipe 19, and the condensed water drainpipe 20, respectively. The silencer 31 extends along the right side stay 30 for absorbing noises of the exhaust gas released from the exhaust gas heat exchanger 9. The silencer 31 is communicated to the exhaust tube 23 while the air intake tube 22 is communicated to the air filter 7. The silencer 31 is joined at its inlet with a bent tube 32 for introducing the exhaust gas from the exhaust gas heat exchanger 9 into the interior of the silencer 31.

Figure 5:
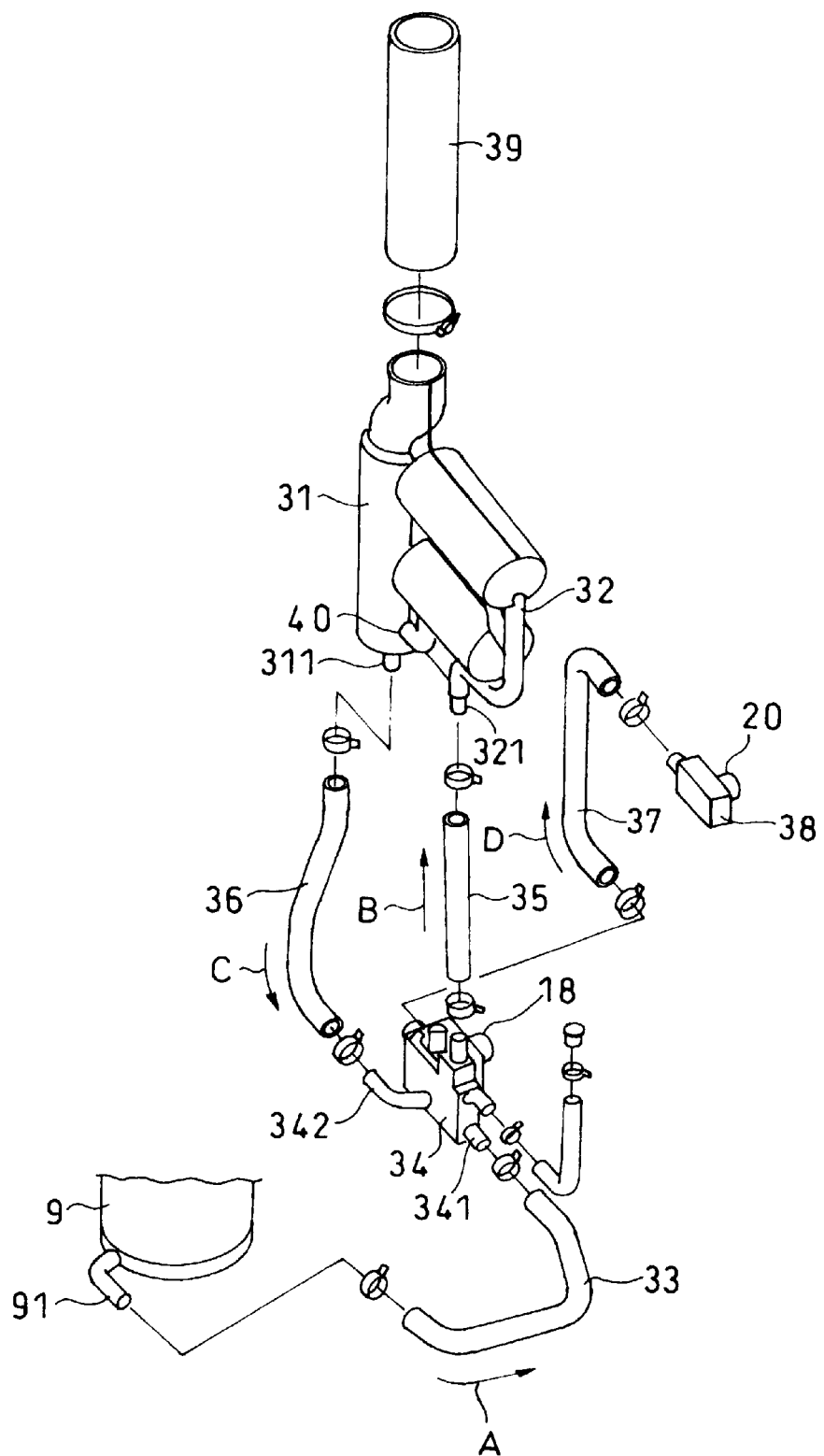
FIG. 5 is an exploded perspective view showing the conveying path of the exhaust gas released from an exhaust gas heat exchanger.

FIG. 5 is an exploded perspective view of the piping of an exhaust system. As shown, the exhaust gas heat exchanger 9 is connected with its outlet pipe 91 to one end of the exhaust gas hose 33 which is in turn connected at the other end to a inlet pipe 341 of the first joint 34 which combines the heat transfer medium inlet pipe 18. A silencer inlet hose 35 is connected at one end by the first joint 34 to the exhaust hose 33 and at the other end to the inlet 321 of the bent tube 32 provided at the upstream of the silencer 31. A silencer outlet hose 39 is mounted on the top of the silencer 31 for communicating with the exhaust tube 23.

The drain hose 36 extending from the drain outlet pipe 311 at the lowermost end of the silencer 31 is connected to an inlet pipe 342 of the first joint 34. A drain outlet hose 37 connected by the first joint 34 to the drain hose 36 is communicated with a second joint 38 connected to the condensed water pipe 20. The drain hose 36 and the drain outlet hose 37 constitute a waste water trap extending downwardly from the silencer 31 and then upwardly from the joint 34. The condensed water trapped in the waste water trap inhibits the exhaust gas in the silencer 31 to flow into the waste water trap and makes the upward movement of the exhaust gas easier. The first joint 34, the second joint 38, and the silencer 31 are fixedly mounted to the right side stay 30 (See FIGS. 3 and 6).

In operation, the exhaust gas from the engine 2 is conveyed into the exhaust gas heat exchanger 9 where its thermal energy is transferred to the heat transfer medium circulated in the circulation path 12, hence lowering its temperature. As its temperature drops, the exhaust gas releases the condensed water which is then discharged together with the exhaust gas from the exhaust gas heat exchanger 9. The exhaust gas with the condensed water are passed through the exhaust hose 33, the first joint 34, and the silencer inlet hose 35 and conveyed into the bent tube 32 (as denoted by the arrows A and B in FIG. 5). The bent tube 32 is joined by a joint 40 to a lower region of the side wall of the silencer 31.

The exhaust gas and the condensed water are separated from each other at the joint 40 between the bent tube 32 and the silencer 31. The exhaust gas is passed through the silencer 31 and the silencer outlet hose 39 and discharged out from the exhaust pipe 23. The condensed water separated from the exhaust gas is passed via the drain hose 36, the first joint 34, and the drain outlet hose 37 to the second joint 38 and discharged from the condensed water drain pipe 20 (as denoted by the arrows C and D in FIG. 5).

Figure 6:
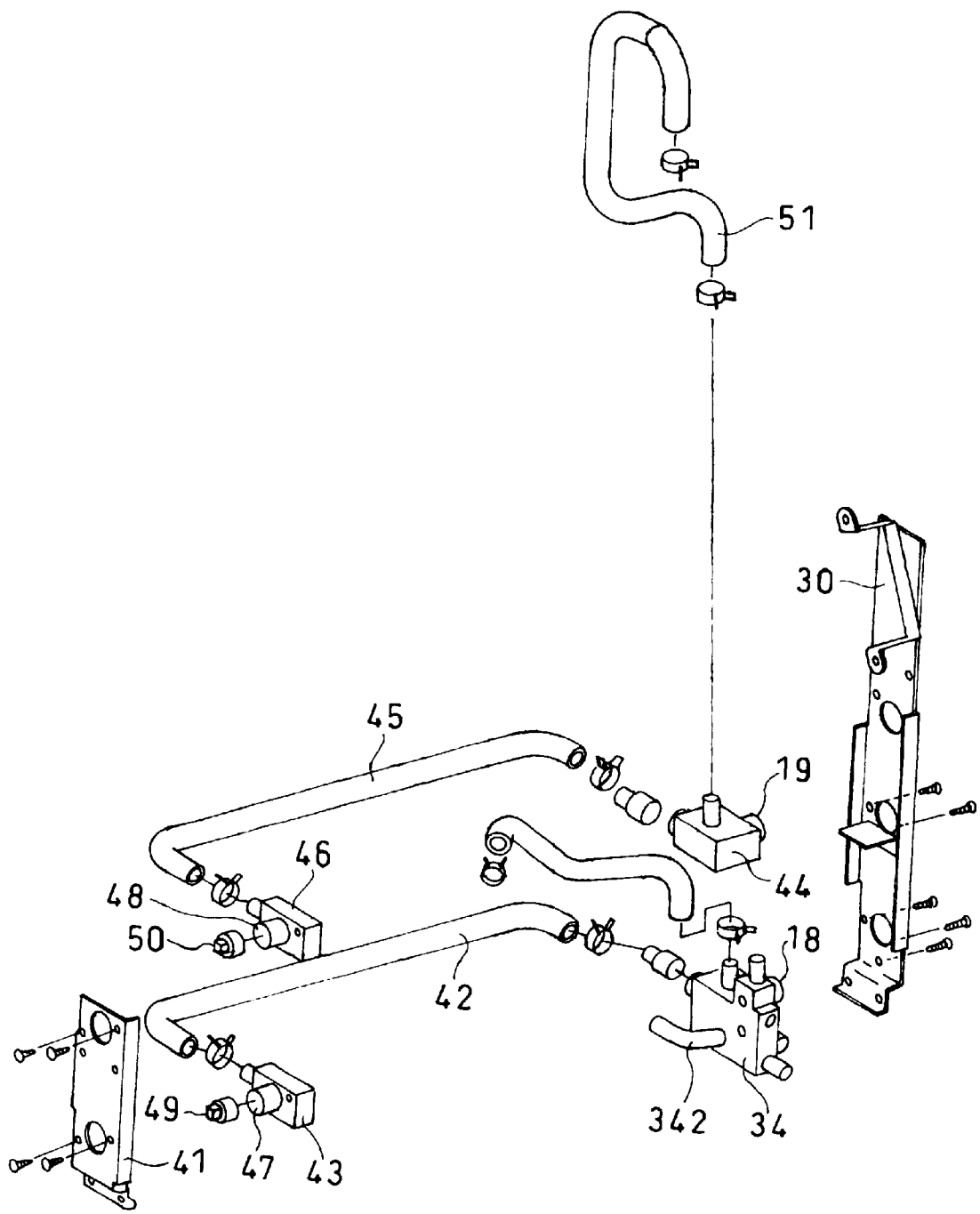
FIG. 6 is an exploded perspective view showing a primary part of the circulating path of a heat transfer medium.

FIG. 6 is an exploded perspective view of the piping of a heat transfer medium circulation system. As shown, a left side stay 41 is provided opposite to the right side stay 30. The left side stay 41 is mounted also upright on the bottom panel 13B. A fourth joint 43 connected by a heat transfer medium inlet hose 42 to the first joint 34 is fixedly mounted to the lower end of the left side stay 41.

A third joint 44 connected with the heat transfer medium outlet pipe 19 is mounted to an intermediate region of the right side stay 30. A fifth joint 46 is mounted to the upper end of the left side stay 41. The third joint 44 and the fifth joint 46 are connected with each other by a heat transfer medium outlet hose 45. The fourth joint 43 and the fifth joint 46 are communicated with a heat transfer medium left inlet pipe 47 and a heat transfer medium left outlet pipe 48, respectively. The fourth joint 43 and the fifth joint 46 are provided for allowing the waste heat recovering apparatus 1 to have the heat transfer medium inlet and outlet located on either a left or right side thereof. When both the heat transfer medium inlet and outlet are located on the right side of the waste heat recovering apparatus 1, the heat transfer medium left inlet pipe 47 and the heat transfer medium left outlet pipe 48 are closed with plugs 49 and 50, respectively. Similarly, when both the heat transfer medium inlet and outlet are located on the left side of the waste heat recovering apparatus 1, the heat transfer medium inlet pipe 18 and the heat transfer medium outlet pipe 19 are closed with plugs 49 and 50, respectively. The third joint 44 is connected with an engine outlet hose 51 extending from the cooling unit of the engine 2.

Figure 7:
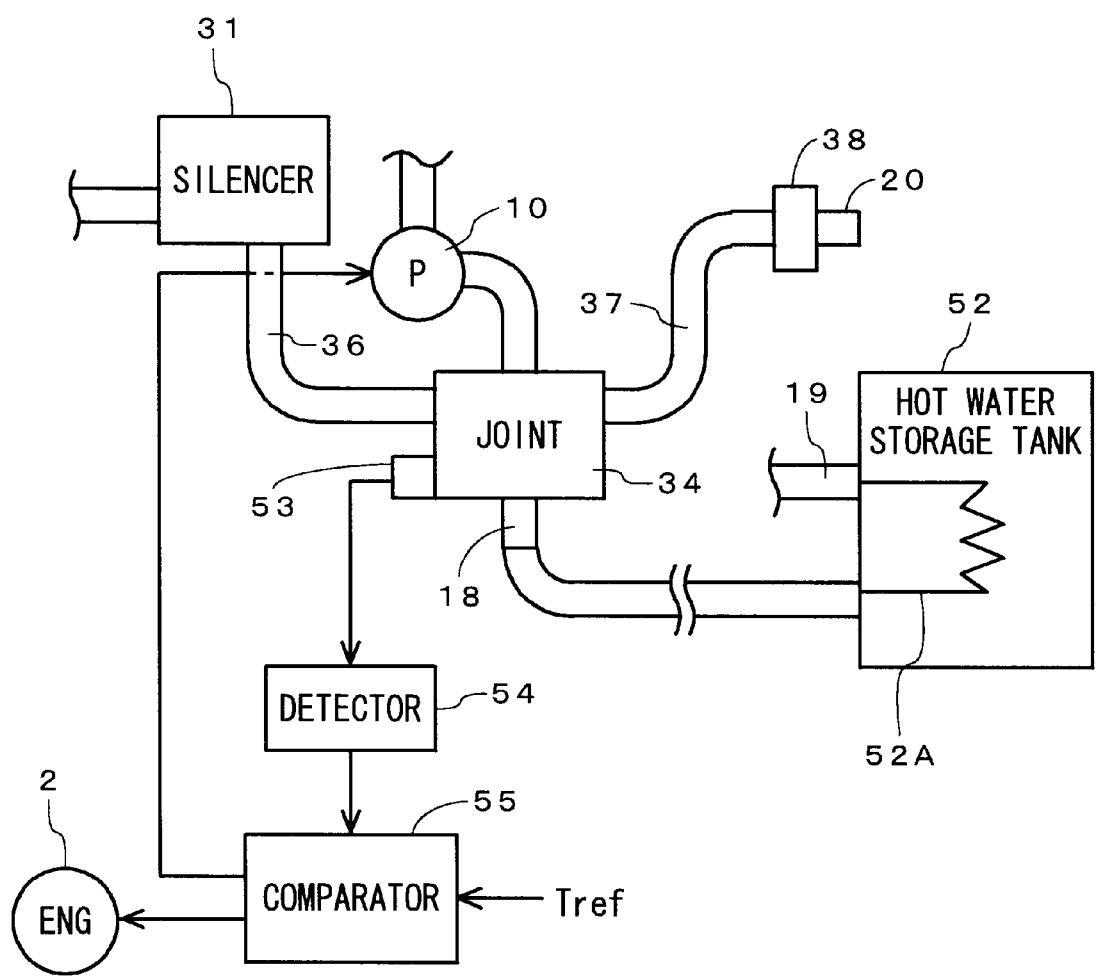
FIG. 7 is a functional block diagram of a means for defrosting the condensed water.

The waste heat recovering apparatus 1 permits the drain hose 36, the drain outlet hose 37, and the first joint 34 communicating these two hoses to each other to form a means for defrosting and protecting the condensed water from freezing in the waste water trap. FIG. 7 is a block diagram showing a function of the defrosting means and freeze preventing means for the condensed water, where like components are denoted by like numerals as those shown in FIGS. 1 to 6. As shown, the heat transfer medium inlet pipe 18 and the heat transfer medium outlet pipe 19 are connected to a heat exchanger 52A in a hot water storage tank 52 acting as the external thermal load.

In operation, cooling water as the heat transfer medium passing through the heat exchanger 52A is conveyed by the action of the water pump 10 to the waste heat recovering apparatus 1. The heat transfer medium passed through the first joint 34 or the fourth joint 43 (See FIG. 6) is conveyed into the engine 2 and the exhaust gas heat exchanger 9 where it recovers heat from the exhaust gas and is then returned back through the third joint 44 or the fifth joint 46 to the hot water storage tank 52. A sensor 53 for measuring the temperature of the waste water trap is mounted to the first joint 34 communicated with the drain hose 36 and the drain outlet hose 37. The sensor 53 is preferably positioned adjacent to the drain hose 36 or the drain outlet hose 37.

A detector 54 includes an A/D converter for converting an output signal of the sensor 53 into a digital form. The digital signal is transferred to a comparator 55 where it is compared with a reference temperature Tref. The reference temperature Tref is a digital value that represents a freezing state of the waste water trap. When the temperature of the waste water trap released as digital data from the detector 54 is lower than the reference temperature Tref, the water pump 10 is switched on before starting the engine 2. This allows the heat transfer medium to be conveyed to the first joint 34 for defrosting and warming the waste water trap. Upon the measurement of the sensor 53 exceeding the reference temperature Tref after the switching on of the water pump 10, the engine 2 is started. The starting of the engine 2 may be initiated when the temperature of the waste water trap exceeds the reference level Tref after the switching on of the water pump 10 or may be timed with the end of a predetermined duration after the water pump 10 is switched on. In the latter case, when a predetermined length of time has elapsed, it is supposed that the condensed water in the waste water trap is completely defrosted. The function of the comparator 55 may be realized as a part of the operation of a microcomputer provided in the ECU 26.

As apparent from the above description, the present invention allows the condensed water in the waste water trap to be changed from its frozen or near frozen state to a liquid state with the energy of the heat transfer medium. Particularly, only the water pump mounted across the circulation path of the heat transfer medium for recovery of heat is utilized for warming the waste water trap, hence contributing to the simplification of the overall arrangement without the use of an electric heater.

What is claimed is:

1. An engine waste heat recovering apparatus having an exhaust gas heat exchanger for recovering heat from the exhaust gas of an engine and a drain passage for discharging the condensed water generated by heat exchange in the exhaust gas heat exchanger, comprising:

said drain passage being formed by first hose means defining a waste water trap; a joint disposed in said waste water trap for interconnecting the first hose means; second hose means forming a heat transfer medium path extending between a source of heat transfer medium and an external heat exchanger;

said second hose means connecting with said joint to dispose said second hose means in heat transfer relation with said first hose means;

a water pump for selectively circulating heat transfer medium along said heat transfer medium flow path; and defrosting means for activating the water pump when the waste water temperature in said waste water trap is determined to be excessively cold.

2. The engine waste heat recovering apparatus according to claim 1, further comprising a silencer for separating the condensed water from the exhaust gas released from the exhaust gas heat exchanger, wherein the joint has a passage provided therein for receiving the exhaust gas from the exhaust gas heat exchanger and transferring it to the silencer and the condensed water separated in the silencer is conveyed to the waste water trap.

3. The engine waste heat recovering apparatus according to claim 2 wherein the defrosting means includes:

a sensor for detecting the temperature of at least one of the waste water trap and waste water; and a freeze detecting means for comparing the temperature detected by the sensor with a reference temperature detected by the sensor with a reference temperature representing the frozen state of the waste water in the waste water trap, and wherein, when it is judged that the waste water trap is in the frozen state on the basis of a result of the comparison, the water pump is activated.

4. The engine waste heat recovering apparatus according to claim 3, wherein the freeze detecting means compares the temperature detected by the sensor with a reference temperature representing the frozen state of the waste water in the waste water trap before starting the engine.

5. The engine waste heat recovering apparatus according to claim 1, wherein the defrosting means includes:

a sensor for detecting the temperature of at least one of the waste water trap waste water; and a freeze detecting means for comparing the temperature detected by the sensor with a reference temperature representing the frozen state of the waste water in the waste water trap, and wherein, when it is judged that the waste water trap is in the frozen state on the basis of a result of the comparison, the water pump is activated.

6. The engine waste heat recovering apparatus according to claim 5, wherein the sensor is mounted to the joint.

7. The engine waste heat recovering apparatus according to claim 5, wherein the freeze detecting means compares the temperature detected by the sensor with a reference temperature representing the frozen state of the waste water in the waste water trap before starting the engine.

* * * * *